US012634835B2

(12) United States Patent
Ly et al.

(10) Patent No.: US 12,634,835 B2
(45) Date of Patent: May 19, 2026

(54) PATHLOSS COMPUTATION FOR POWER CONTROL IN THE PRESENCE OF RECONFIGURABLE INTERACTIVE SURFACES

(71) Applicant: QUALCOMM Incorporated, San Diego, CA (US)

(72) Inventors: Hung Dinh Ly, San Diego, CA (US); Saeid Sahraei, San Diego, CA (US); Yu Zhang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 335 days.

(21) Appl. No.: 18/572,706

(22) PCT Filed: Aug. 16, 2021

(86) PCT No.: PCT/CN2021/112695
§ 371 (c)(1),
(2) Date: Dec. 20, 2023

(87) PCT Pub. No.: WO2023/019383
PCT Pub. Date: Feb. 23, 2023

(65) Prior Publication Data
US 2024/0373368 A1 Nov. 7, 2024

(51) Int. Cl.
*H04W 52/24* (2009.01)
*H04B 7/04* (2017.01)
*H04W 52/14* (2009.01)

(52) U.S. Cl.
CPC ...... *H04W 52/242* (2013.01); *H04B 7/04013* (2023.05); *H04W 52/146* (2013.01)

(58) Field of Classification Search
CPC .............. H04W 52/242; H04W 52/146; H04B 7/04013
See application file for complete search history.

(56) References Cited

U.S. PATENT DOCUMENTS 9,295,007 B2 *  3/2016  Park ...................... H04W 52/40
2019/0349867 A1 *  11/2019  MolavianJazi ....... H04W 52/16
(Continued)

OTHER PUBLICATIONS

Alcatel-Lucent Shanghai Bell, et al., "Uplink Power Control Considerations for CoMP", 3GPP TSG RAN WG1 Meeting RAN1#65, R1-111433, UL CoMP Power Control Final, 3rd Generation Partnership Project, Mobile Competence Centre, 650, Route Des Lucioles, F-06921 Sophia-Antipolis Cedex, France, vol. RAN WG1, No. Barcelona, Spain, May 9, 2011, May 3, 2011, 3 Pages, XP050491126, Section 2-3.
(Continued)

*Primary Examiner* — Curtis A Kuntz
(74) *Attorney, Agent, or Firm* — QUALCOMM Incorporated

(57) ABSTRACT

A method for wireless communication performed by a user equipment (UE) includes receiving multiple reference signals (RSs), each RS of the plurality of RSs being associated with a reflection from a respective reconfigurable intelligent surface (RIS), of multiple RISs, or with a direct transmission from a base station. The method also includes receiving, from the base station, a RIS configuration indicating a set of operative RISs, of the plurality of RISs, that reflect an uplink transmission from the UE. The method further includes transmitting, to the base station, an uplink message according to an uplink transmission power, the uplink transmission power being based on an effective pathloss that is a function of each pathloss of a set of pathlosses respectively associated with a set of RSs, of the multiple RSs, that are
(Continued)

respectively associated with the set of operative RISs or the base station.

30 Claims, 9 Drawing Sheets

(56)                    References Cited

U.S. PATENT DOCUMENTS

2021/0195530 A1*   6/2021  Venugopal ..........  H04W 52/146
2022/0346025 A1*  10/2022  Zhang ...................  H04W 52/46
2023/0328660 A1*  10/2023  Choi .....................  H04W 52/08
                                                               370/318

OTHER PUBLICATIONS

Cai P., et al., "Downlink Channel Tracking for Intelligent Reflecting Surface-Aided FDD MIMO Systems", IEEE Transactions On Vehicular Technology, IEEE, USA, vol. 70, No. 4, Mar. 2, 2021, pp. 3341-3353, XP011852433, ISSN: 0018-9545, DOI: 10.1109/TVT. 2021.3063138, Abstract Section III.A, Section V, Figure 3.
International Search Report and Written Opinion—PCT/CN2021/112695—ISA/EPO—Feb. 14, 2022.
Wymeersch H., et al., "Radio Localization and Mapping With Reconfigurable Intelligent Surfaces", Arxiv.org, Cornell University Library, 201 Olin Library Cornell University, Ithaca, NY 14853, Jun. 11, 2020, XP081681498, 9 Pages, Figure 4.

* cited by examiner

300

320

310

302

312

314

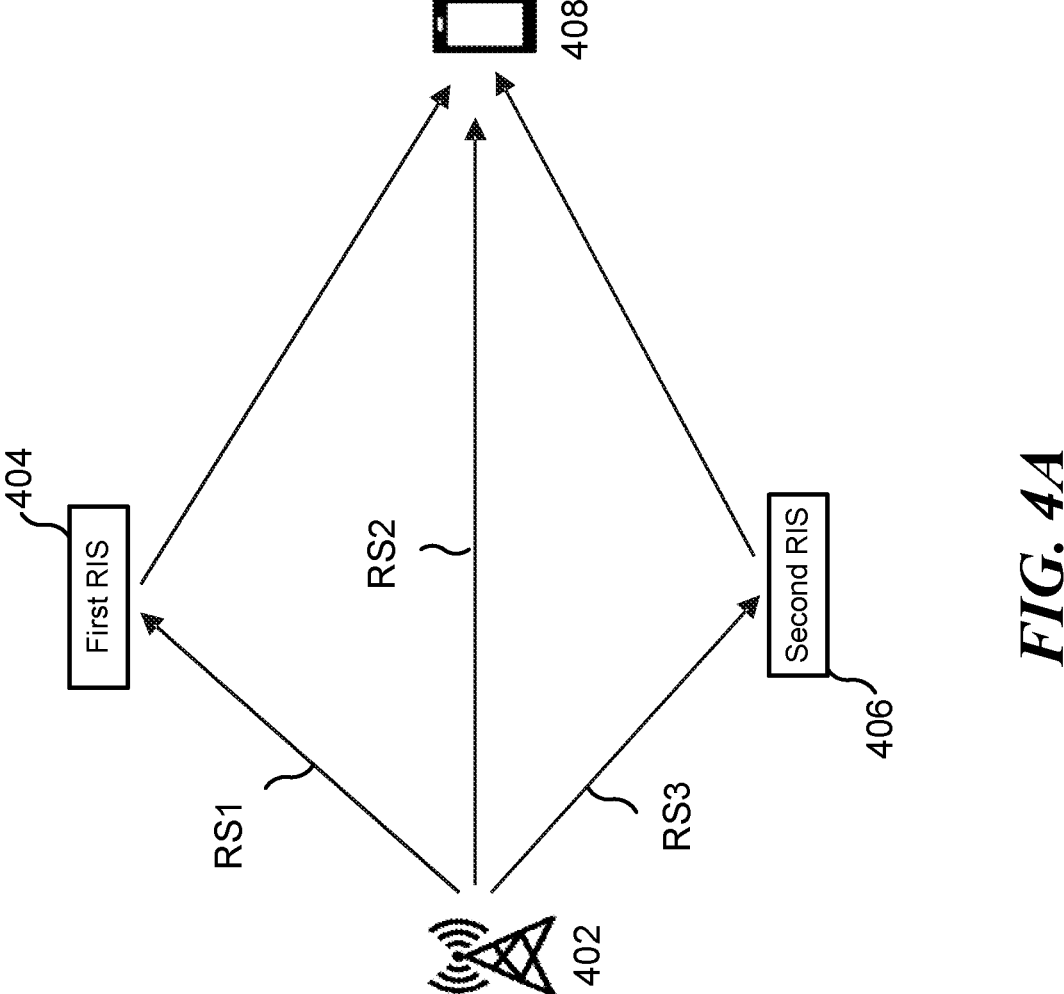
*FIG. 4A*

Communications Manager

RS Component

525

Pathloss Component

530

Receiver

510

Transmitter

520

515

500

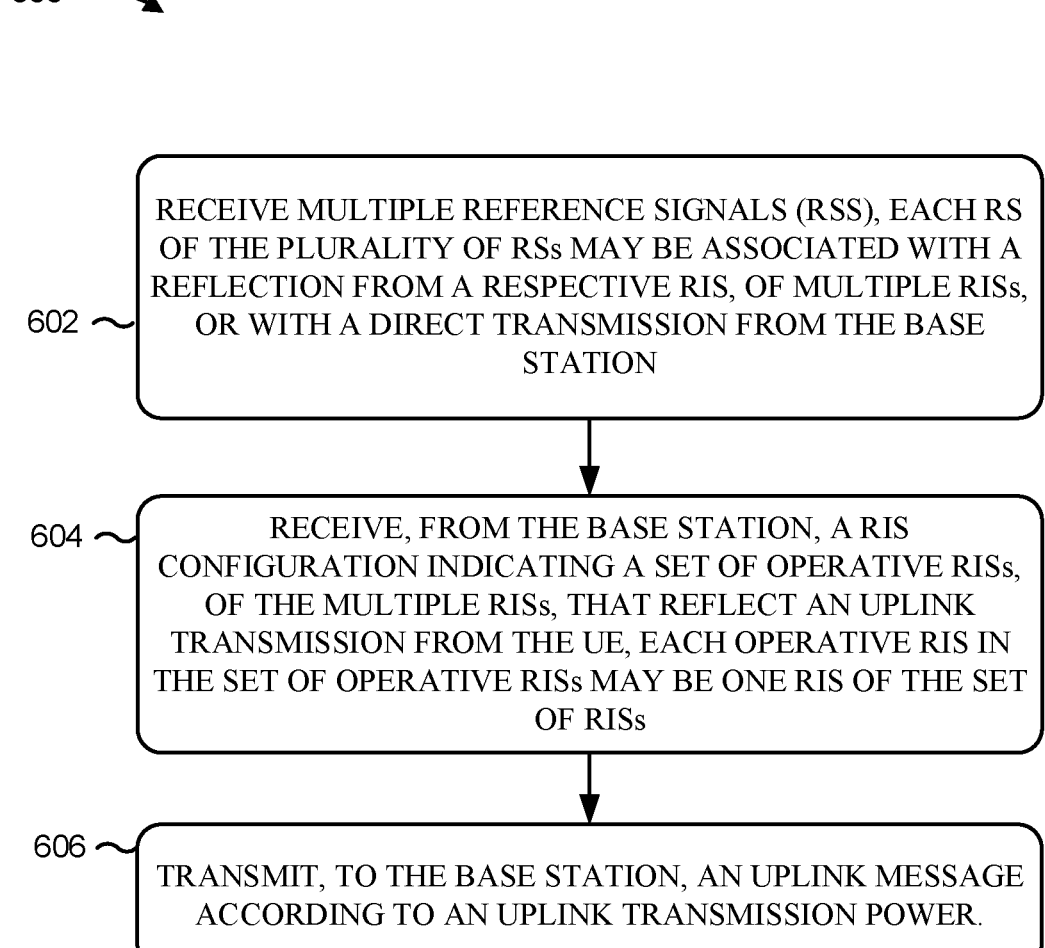

600 →

602 ~ RECEIVE MULTIPLE REFERENCE SIGNALS (RSS), EACH RS OF THE PLURALITY OF RSs MAY BE ASSOCIATED WITH A REFLECTION FROM A RESPECTIVE RIS, OF MULTIPLE RISs, OR WITH A DIRECT TRANSMISSION FROM THE BASE STATION

604 ~ RECEIVE, FROM THE BASE STATION, A RIS CONFIGURATION INDICATING A SET OF OPERATIVE RISs, OF THE MULTIPLE RISs, THAT REFLECT AN UPLINK TRANSMISSION FROM THE UE, EACH OPERATIVE RIS IN THE SET OF OPERATIVE RISs MAY BE ONE RIS OF THE SET OF RISs

606 ~ TRANSMIT, TO THE BASE STATION, AN UPLINK MESSAGE ACCORDING TO AN UPLINK TRANSMISSION POWER.

Communications Manager

RS Component

725

Active RIS Component

735

Receiver

710

Transmitter

720

800 →

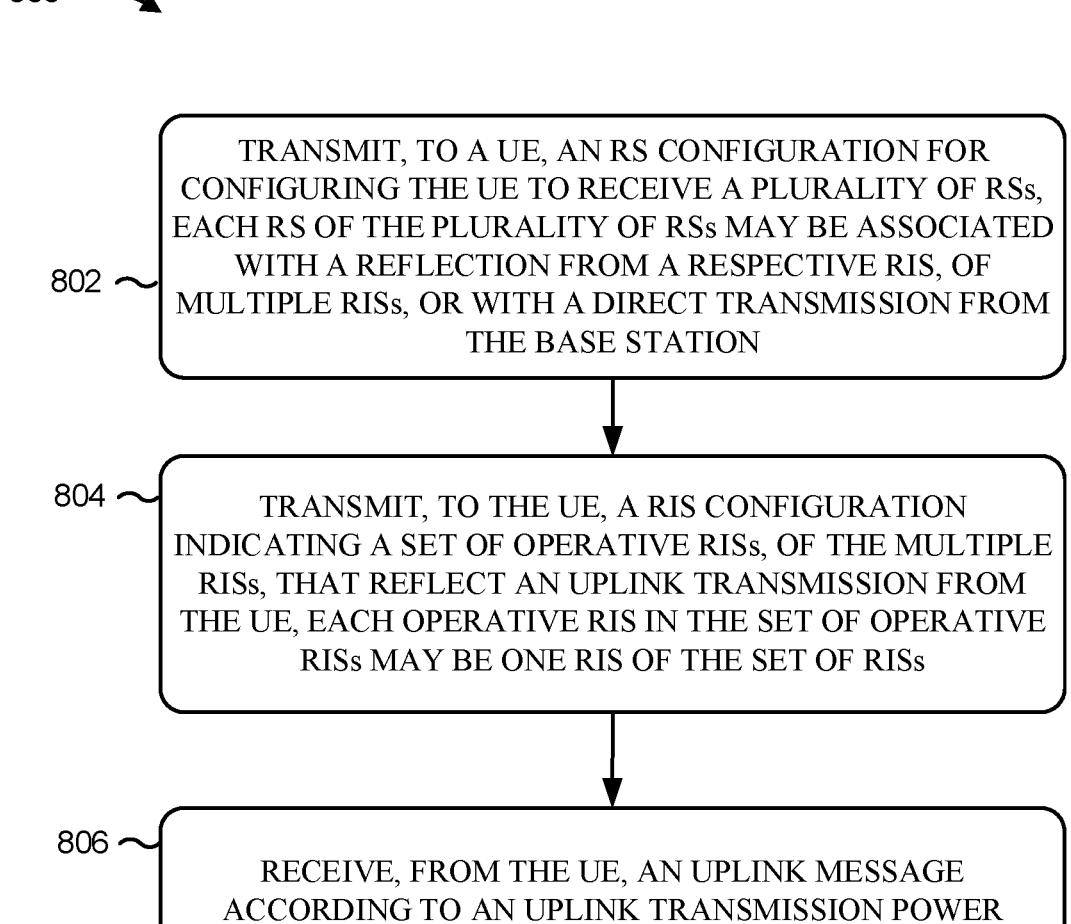

802 ～ TRANSMIT, TO A UE, AN RS CONFIGURATION FOR CONFIGURING THE UE TO RECEIVE A PLURALITY OF RSs, EACH RS OF THE PLURALITY OF RSs MAY BE ASSOCIATED WITH A REFLECTION FROM A RESPECTIVE RIS, OF MULTIPLE RISs, OR WITH A DIRECT TRANSMISSION FROM THE BASE STATION

804 ～ TRANSMIT, TO THE UE, A RIS CONFIGURATION INDICATING A SET OF OPERATIVE RISs, OF THE MULTIPLE RISs, THAT REFLECT AN UPLINK TRANSMISSION FROM THE UE, EACH OPERATIVE RIS IN THE SET OF OPERATIVE RISs MAY BE ONE RIS OF THE SET OF RISs

806 ～ RECEIVE, FROM THE UE, AN UPLINK MESSAGE ACCORDING TO AN UPLINK TRANSMISSION POWER

*FIG. 8*

PATHLOSS COMPUTATION FOR POWER CONTROL IN THE PRESENCE OF RECONFIGURABLE INTERACTIVE SURFACES

FIELD OF THE DISCLOSURE

The present disclosure relates generally to wireless communications, and more specifically to computing a pathloss for power control in the presence of reconfigurable interactive surfaces.

BACKGROUND

Wireless communication systems are widely deployed to provide various telecommunications services such as telephony, video, data, messaging, and broadcasts. Typical wireless communication systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunication system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communication network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

In some wireless networks, passive MIMO antenna units may replace one or more active antenna units. A reconfigurable intelligent surface (RIS) is an example of a passive MIMO antenna unit. The RIS may be an electromagnetic material controlled by a wireless device, such as a base station, to extend coverage of a wireless network with a minimum impact on a total power consumption of a wireless system associated with the wireless network. In some examples, the RIS may be controlled to reflect an impinging signal to a desired direction. In some such examples, the base station may control the RIS. Additionally, or alternatively, the base station may control the RIS to adjust one or more characteristics of an impinging signal. These characteristics may include, for example, a phase, an amplitude, a frequency, or polarization.

SUMMARY

In one aspect of the present disclosure, a method for wireless communication by a user equipment (UE) is presented. The method includes receiving multiple reference signals (RSs). Each RS of the multiple RSs being associated with a reflection from a respective reconfigurable intelligent surface (RIS), of multiple RISs, or with a direct transmission from a base station. The method further includes receiving, from the base station, a RIS configuration indicating a set of operative RISs, of the multiple RISs, that reflect an uplink transmission from the UE. The method still further includes transmitting, to the base station, an uplink message according to an uplink transmission power. The uplink transmission power may be based on an effective pathloss that is a function of each pathloss of a set of pathlosses respectively associated with a set of RSs, of the multiple RSs, that are respectively associated with the set of operative RISs or the base station.

Another aspect of the present disclosure is directed to an apparatus for wireless communications at a UE. The apparatus includes means for receiving multiple RSs. Each RS of the multiple RSs being associated with a reflection from a respective RIS, of multiple RISs, or with a direct transmission from a base station. The apparatus further includes means for receiving, from the base station, a RIS configuration indicating a set of operative RISs, of the multiple RISs, that reflect an uplink transmission from the UE. The apparatus still further includes means for transmitting, to the base station, an uplink message according to an uplink transmission power. The uplink transmission power may be based on an effective pathloss that is a function of each pathloss of a set of pathlosses respectively associated with a set of RSs, of the multiple RSs, that are respectively associated with the set of operative RISs or the base station.

In another aspect of the present disclosure, a non-transitory computer-readable medium with non-transitory program code recorded thereon for wireless communications at a UE is disclosed. The program code is executed by a processor and includes program code to receive multiple RSs. Each RS of the multiple RSs being associated with a reflection from a respective RIS, of multiple RISs, or with a direct transmission from a base station. The program code further includes program code to receive, from the base station, a RIS configuration indicating a set of operative RISs, of the multiple RISs, that reflect an uplink transmission from the UE. The program code still further includes program code to transmit, to the base station, an uplink message according to an uplink transmission power. The uplink transmission power may be based on an effective pathloss that is a function of each pathloss of a set of pathlosses respectively associated with a set of RSs, of the multiple RSs, that are respectively associated with the set of operative RISs or the base station.

Another aspect of the present disclosure is directed to apparatus for wireless communications at a UE is presented. The apparatus includes a processor, a memory coupled with the processor, and instructions stored in the memory and operable, when executed by the processor, to cause the apparatus to receive multiple RSs. Each RS of the multiple RSs being associated with a reflection from a respective RIS, of multiple RISs, or with a direct transmission from a base station. Execution of the instructions further cause the apparatus to receive, from the base station, a RIS configuration indicating a set of operative RISs, of the multiple RISs, that reflect an uplink transmission from the UE. Execution of the instructions also cause the apparatus to transmit, to the base station, an uplink message according to an uplink transmission power. The uplink transmission power may be based on an effective pathloss that is a function of each pathloss of a set of pathlosses respectively associated with a set of RSs, of the multiple RSs, that are respectively associated with the set of operative RISs or the base station.

In one aspect of the present disclosure, a method for wireless communication by a base station is presented. The method includes transmitting, to a UE, an RS configuration for configuring the UE to receive multiple RSs. Each RS of the multiple RSs being associated with a reflection from a respective RIS, of multiple RISs, or with a direct transmission from a base station. The method further includes transmitting, to the UE, a RIS configuration indicating a set of operative RISs, of the multiple RISs, that reflect an uplink transmission from the UE. The method still further includes receiving, from the UE, an uplink message according to an uplink transmission power. The uplink transmission power may be based on an effective pathloss that is a function of each pathloss of a set of pathlosses respectively associated with a set of RSs, of the multiple RSs, that are respectively associated with the set of operative RISs or the base station.

Another aspect of the present disclosure is directed to an apparatus for wireless communications at a base station. The apparatus includes means for transmitting, to a UE, an RS configuration for configuring the UE to receive multiple RSs. Each RS of the multiple RSs being associated with a reflection from a respective RIS, of multiple RISs, or with a direct transmission from a base station. The apparatus further includes means for transmitting, to the UE, a RIS configuration indicating a set of operative RISs, of the multiple RISs, that an uplink transmission from the UE. The apparatus still further includes means for receiving, from the UE, an uplink message according to an uplink transmission power. The uplink transmission power may be based on an effective pathloss that is a function of each pathloss of a set of pathlosses respectively associated with a set of RSs, of the multiple RSs, that are respectively associated with the set of operative RISs or the base station.

In another aspect of the present disclosure, a non-transitory computer-readable medium with non-transitory program code recorded thereon for wireless communications at a base station is disclosed. The program code is executed by a processor and includes program code to transmit, to a UE, an RS configuration for configuring the UE to receive multiple RSs. Each RS of the multiple RSs being associated with a reflection from a respective RIS, of multiple RISs, or with a direct transmission from a base station. The program code further includes program code to transmit, to the UE, a RIS configuration indicating a set of operative RISs, of the multiple RISs, that reflect an uplink transmission from the UE. The program code still further includes program code to receive, from the UE, an uplink message according to an uplink transmission power. The uplink transmission power may be based on an effective pathloss that is a function of each pathloss of a set of pathlosses respectively associated with a set of RSs, of the multiple RSs, that are respectively associated with the set of operative RISs or the base station.

Another aspect of the present disclosure is directed to apparatus for wireless communications at a base station. The apparatus includes a processor, a memory coupled with the processor, and instructions stored in the memory and operable, when executed by the processor, to cause the apparatus to transmit, to a UE, an RS configuration for configuring the UE to receive multiple RSs. Each RS of the multiple RSs being associated with a reflection from a respective RIS, of multiple RISs, or with a direct transmission from a base station. Execution of the instructions further cause the apparatus to transmit, to the UE, a RIS configuration indicating a set of operative RISs, of the multiple RISs, that reflect an uplink transmission from the UE. Execution of the instructions also cause the apparatus to receive, from the UE, an uplink message according to an uplink transmission power. The uplink transmission power may be based on an effective pathloss that is a function of each pathloss of a set of pathlosses respectively associated with a set of RSs, of the multiple RSs, that are respectively associated with the set of operative RISs or the base station.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 4A is a block diagram illustrating a wireless network including a base station and multiple RISs, in accordance with aspects of the present disclosure.

FIG. 6 is a flow diagram illustrating an example process performed, for example, by a user equipment (UE), in accordance with various aspects of the present disclosure.

FIG. 8 is a flow diagram illustrating an example process performed, for example, by a base station, in accordance with various aspects of the present disclosure.

DETAILED DESCRIPTION

Figure 1:
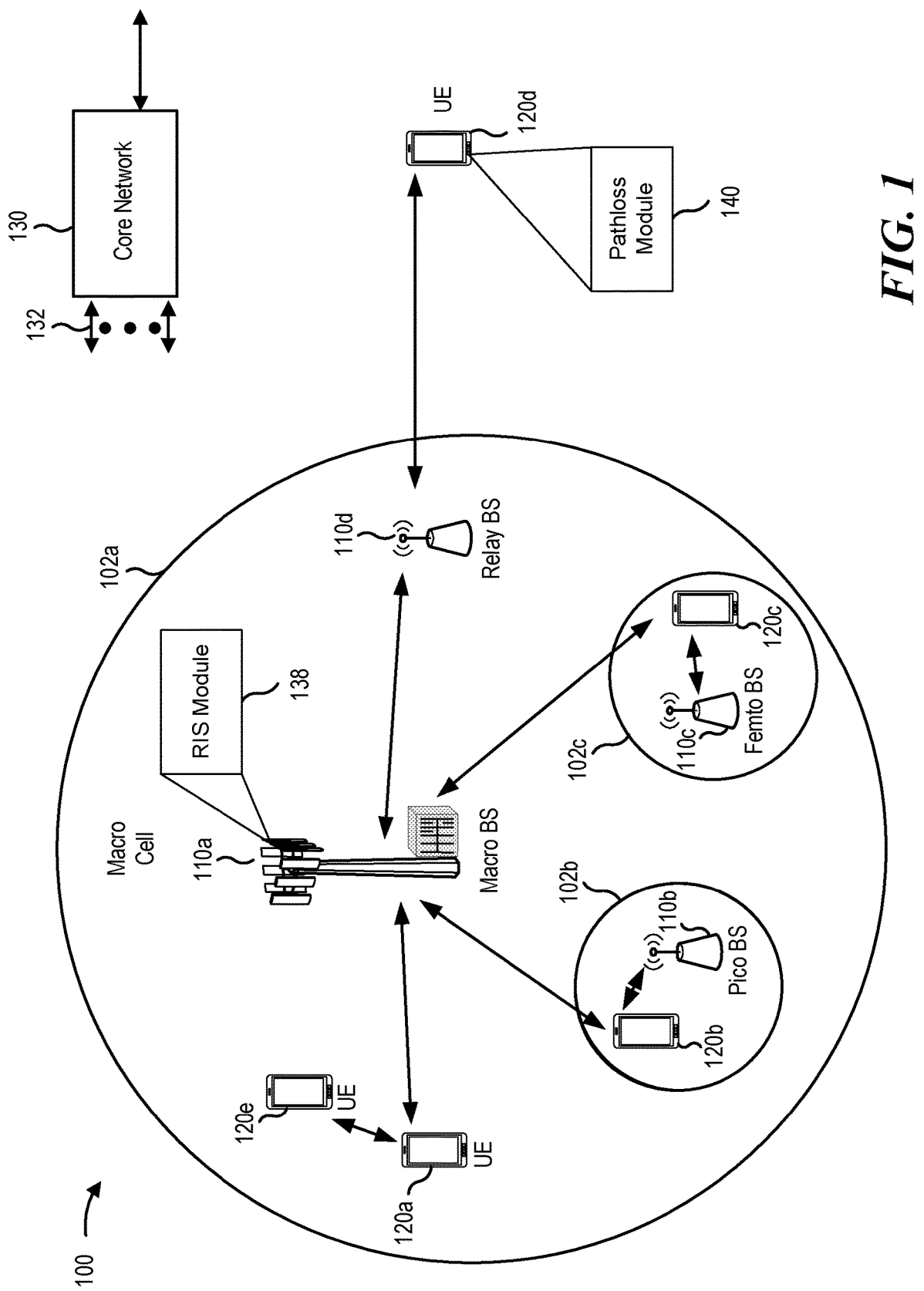
FIG. 1 is a block diagram conceptually illustrating an example of a wireless communication network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communication systems, such as and including 3G and/or 4G technologies.

In some wireless networks, massive multiple-input multiple-output (MIMO) may be implemented to extend network coverage and also increase network throughput. In some examples, massive MIMO may use multiple active antenna units (AAUs) (for example, base stations) to extend network coverage and also increase network throughput (for example, improve beamforming gains). Although multiple AAUs may increase network coverage, multiple AAUs may also increase a total power consumption of a wireless system associated with the wireless network. It may be desirable to decrease power consumption while also extending network coverage. In some examples, one or more reconfigurable intelligent surfaces (RISs) may be deployed in a wireless network to extend coverage of the wireless network with a minimum impact on a total power consumption of a wireless system associated with the wireless network. A RIS is an example of a passive MIMO antenna unit. In some examples, a RIS may be configured to reflect an impinging signal to a desired direction. In some such examples, the RIS may be configured to reflect a downlink signal from a base station to a UE. In other such examples, the RIS may be configured to reflect an uplink signal from the UE to the base station. A RIS that is configured to reflect a transmission may be an example of an operative RIS. Alternatively, a RIS that is configured to scatter a transmission may be an example of an inoperative RIS. In some examples, a number of RISs configured to reflect the downlink signal from the base station to the UE may be different from a number of RISs configured to reflect the uplink signal from the UE to the base station.

Aspects of the present disclosure are directed to indicating a set of RISs that may be operative during an uplink transmission by a UE. In some examples, the UE may receive an RS configuration for configuring the UE to receive multiple RSs. Each of the multiple RSs, may be associated with a reflection from a RIS of a set of RISs or a direct transmission from a base station. In such examples, the UE may receive the multiple RSs and measure a pathloss associated with each RS based on the RS configuration. The UE may also receive a RIS configuration indicating a set of operative RISs configured to reflect an uplink transmission from the UE. Each operative RIS in the set of operative RISs is one of the RISs in the set of RISs that reflected one of the multiple RSs. As discussed, a number of operative RISs may be different from (for example, less than or equal to) a number of RIS in the set of RIS. In some examples, the UE may determine an effective pathloss based on a function of each pathloss of a set of pathlosses. In such examples, each pathloss of the set of pathlosses is associated with a respective RS of a set of RSs, where each RS of the set of RSs is associated with a respective operative RIS of the set of operative RISs or the base station. In some examples, the UE may receive a function configuration indicating the function for determining the effective pathloss. In some such examples, the function may be a linear average, a geometric average, a maximum, or a minimum. The UE may then determine an uplink transmission power based on the effective pathloss. Additionally, the UE may perform an uplink transmission according to the uplink transmission power.

Particular aspects of the subject matter described in this disclosure can be implemented to realize one or more of the following potential advantages. In some examples, the described techniques can improve an accuracy of a pathloss calculated at the UE by accounting for a set of operative RISs that may configured to reflect an uplink transmission by the UE. By improving an accuracy of the pathloss calculation, some aspects of the present disclosure may also improve an accuracy of an uplink transmission power calculated at the UE.

FIG. 1 is a block diagram conceptually illustrating an example of a wireless communication network 100 in which aspects of the present disclosure may be practiced. The wireless communication network 100 may be a 5G or NR network or some other wireless network, such as an LTE network. The wireless communication network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B, an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless communication network 100 through various types of backhaul interfaces such as a direct physical connection, a virtual network, and/or the like using any suitable transport network.

The wireless communication network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless communication network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless communication network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless communication network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless communication network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a pathloss module 140. For brevity, only one UE 120d is shown as including the pathloss module 140. The pathloss module 140 may receive multiple RSs; receive a RIS configuration indicating a set of operative RISs configured to reflect an uplink transmission from the UE 120; and transmit an uplink message according to an uplink transmission power The core network 130 or the base stations 110 may include a RIS module 138 for transmitting, to a UE 120, an RS configuration for configuring the UE 120 to receive a number of RSs; transmitting, to the UE 120, a RIS configuration indicating a set of operative RISs configured to reflect an uplink transmission from the UE 120; and receiving, from the UE 120, an uplink message according to an uplink transmission power.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
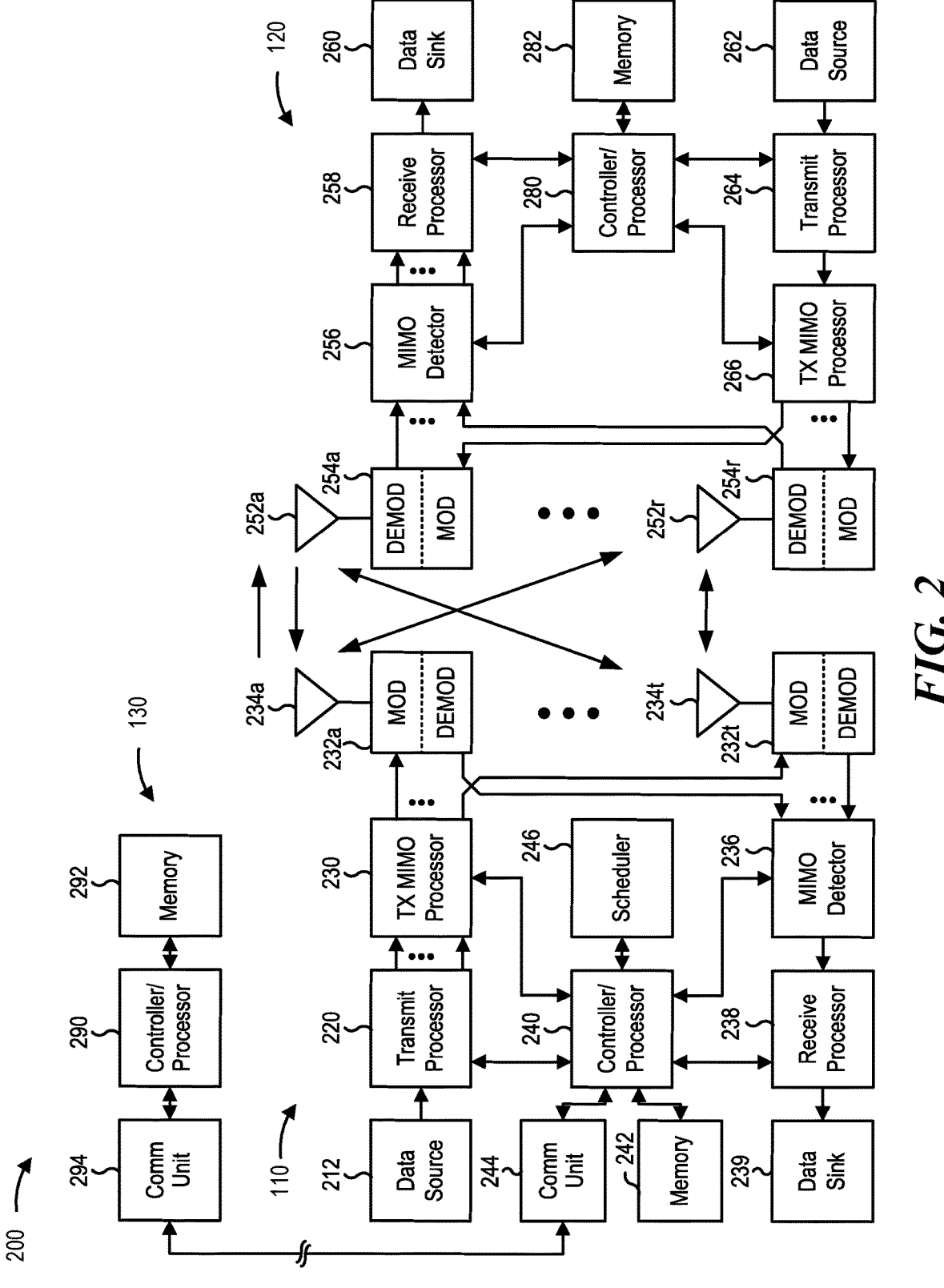
FIG. 2 is a block diagram conceptually illustrating an example of a base station in communication with a user equipment (UE) in a wireless communication network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with determining an effective pathloss based on a set of pathlosses, where each pathloss of the set of pathlosses is associated with a reference signal (RS) received based on a reflection from a RIS or a direct transmission from a base station, as described in more detail elsewhere. For example, the controller/processor 240 of the base station 110, the controller/processor 280 of the UE 120, and/or any other component(s) of FIG. 2 may perform or direct operations of, for example, the processes of FIGS. 6 and 8 and/or other processes as described. Memories 242 and 282 may store data and program codes for the base station 110 and UE 120, respectively. A scheduler 246 may schedule UEs for data transmission on the downlink and/or uplink.

In some wireless networks, massive MIMO may be implemented to extend network coverage and also increase network throughput. In some examples, massive MIMO may use multiple active antenna units (AAUs) (for example, base stations) to extend network coverage and also increase network throughput (for example, improve beamforming gains). In some such examples, two UEs may be within range of a first AAU. However, the signal from the first AAU may not reach one of the two UEs due to blockage, such as a building blocking the signal. In such examples, a second AAU may be deployed to extend network coverage to the UE that failed to receive the signal from the first AAU. Although multiple AAUs may increase network coverage, multiple AAUs may also increase a total power consumption of a wireless system associated with the wireless network.

Figure 3:
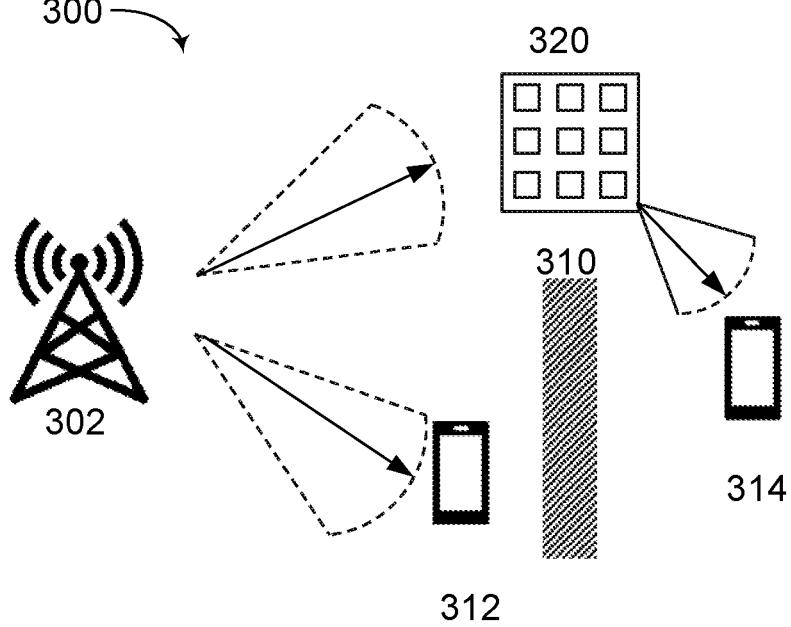
FIG. 3 is a block diagram illustrating a wireless communication network employing a reconfigurable intelligent surface (RIS) to extend coverage, in accordance with aspects of the present disclosure.

It may be desirable to decrease power consumption while also extending network coverage. In some examples, one or more RISs may be deployed in a wireless network to extend coverage of the wireless network with a minimum impact on a total power consumption of a wireless system associated with the wireless network. FIG. 3 is a block diagram illustrating a wireless communication network 300 employing a RIS 310 to extend network coverage, in accordance with aspects of the present disclosure. As shown in the example of FIG. 3, the wireless communication network 300 also includes a base station 302 and two UEs 312 and 314. The base station 302 may be an example of a base station 110 as described with reference to FIGS. 1 and 2. The UEs 312 and 314 may be examples of a UE 120 as described with reference to FIGS. 1 and 2. In the example of FIG. 3, an environmental feature 320, such as a building, a mountain, or another type of natural or manmade object, may block a signal from the base station 302 to the second UE 314. In some examples, the second UE 314 may fail to receive the signal from the base station 302 due to the blockage. In contrast, the first UE 312 may directly receive a signal from the base station 302. In some other examples, a quality of the signal received at the second UE 314 from the base station

302 may be less than a signal quality threshold due to the blockage by the environmental feature 320. In contrast to conventional systems that may deploy another AAU to extend coverage to the second UE 314, the example of FIG. 3 uses the RIS 310 to reflect the signal from the base station 302 signal around the environmental feature (for example, around the blockage) to the second UE 314. In such an example, the RIS 310 may extend network coverage from the base station 302 to the second UE 314.

In some examples, the RIS 310 may be controlled to reflect an impinging signal to a desired direction, such as toward the second UE 314. In some such examples, the base station 302 may control the RIS 310. Additionally, or alternatively, the base station 302 may control the RIS 310 to adjust one or more characteristics of an impinging signal. These characteristics may include, for example, a phase, an amplitude, a frequency, or polarization of a signal transmitted by the base station 302 or the UEs 312 and 314.

In some examples, a UE may perform a transmission on a physical uplink shared channel (PUSCH) on an active uplink (UL) bandwidth part (BWP) b of an uplink carrier f of a serving cell c using a parameter set configuration associated with an index j and a PUSCH power control adjustment state associated with an index $\ell$. In such examples, the UE determines the PUSCH transmission power $P_{PUSCH,b,f,c}(i,j,q_d, \ell)$ in a PUSCH transmission occasion i as follows:

$$P_{PUSCH,b,f,c}(i, j, q_d, \ell) = \tag{1}$$

$$\min \begin{cases} P_{CMAX,f,c}(i), \\ P_{O\_PUSCH,b,f,c}(j) + 10 \log_{10}(2^{\mu} M_{RB,b,f,c}^{PUSCH}(i) \cdot PL_{b,f,c}(q_d) + \\ \qquad \Delta_{T,F,b,f,c}(i) + f_{b,f,c}(i, \ell) \end{cases}$$

In Equation 1, $P_{O\_PUSCH}$ represents a parameter value preset from a base station, $\alpha$ represents a fractional pathloss compensation factor, PL represents a downlink pathloss estimate determined at the UE using an RS index $q_d$ for an active downlink (DL) BWP, and $\Delta_{TF}$ represents an offset dependent on a modulation and coding scheme (MCS). In some examples, a set of RS configurations for a number of RS resources is provided by a higher layer parameter PUSCH-PathlossReferenceRS. $P_{cMAX,f,c}(i)$ represents a maximum UE transmit power per uplink carrier f of the serving cell c in the PUSCH transmission occasion i.

$$M_{RB,b,f,c}^{PUSCH}(i)$$

represents a bandwidth of the PUSCH resource assignment expressed in a number of resource blocks for the PUSCH transmission occasion i on the active uplink BWP b of the uplink carrier f of the serving cell c and $\mu$ represents a subcarrier spacing (SCS). Additionally, $f_{b,f,c}(i,\ell)$ represents the PUSCH power control adjustment state f for the active uplink BWP b of the uplink carrier f of the serving cell c in the PUSCH transmission occasion i, where:

$$f_{b,f,c}(i, \ell) = f_{b,f,c}(i - i_0, \ell) + \sum_{m=0}^{|D_i|-1} \delta_{PUSCH,b,f,c}(m, \ell) \tag{2}$$

As shown in Equation 2, the PUSCH power control adjustment state $\ell$ ($f_{b,f,c}(i,\ell)$) may be a sum of transmit power control (TPC) command values $\delta_{PUSCH,b,f,c}(m,\ell)$ in a set $D_i$ of TPC command values $\delta_{PUSCH,b,f,c}(m,\ell)$ received at the UE between two reference points. In the example of Equation 2, the TPC command value $\delta_{PUSCH,b,f,c}(m,\ell)$ is an accumulated correction value that may be based on previous TPC command values. In some implementations, the base station transmits a TPC command field value in control information, such as downlink control information (DCI), indicating the TPC command value. In some examples, the TPC command field values may be associated with TPC command values based on Table 1.

TABLE 1

| TPC Command Field | Accumulated $\delta_{PUSCH,\,b,\,f,\,c}$ | Absolute $\delta_{PUSCH,\,b,\,f,\,c}$ |
|---|---|---|
| 0 | −1 | −4 |
| 1 | 0 | −1 |
| 2 | 1 | 1 |
| 3 | 3 | 4 |

In the example of Table 1, each TPC command field value is associated with an accumulated TPC command value. For example, a TPC command field having a value of zero is associated with an accumulated TPC command having a value of negative one. In such an example, the UE may reduce (for example, correct) the uplink transmission power by one dB based on receiving a TPC command field having a value of zero.

As shown in Table 1, the dynamic range of the accumulated TPC command $\delta_{PUSCH,b,f,c}$ is −1 to 3 (for example, {−1, 0, 1, 3}. In some implementations, that dynamic range of Table 1 may be insufficient to accommodate a wireless network with one or more RISs. Therefore, it may be desirable to use a new table based on a presence of one or more RISs in the wireless network. In some examples, an RRC message may provide a new table with an increased dynamic range in comparison to the dynamic range of Table 1. In some other examples, multiple tables may be specified for the UE. In such examples, the base station may indicate a desired table from the multiple tables based on a presence of one or more RIS in the wireless network. Additionally, or alternatively, in some implementations, multiple values may be specified for the parameter value $P_{O\_PUSCH}$. In such implementations, the base station may indicate a desired parameter value $P_{O\_PUSCH}$ based on a presence of one or more RISs in the wireless network As discussed, the pathloss may be estimated based on one or more RSs received at the UE. The RSs may be associated with the set of RS configurations indicated in the PUSCH-PathlossReferenceRS parameter. In some examples, each RIS may be associated with an RS configuration of the set of RS configurations. Thus, the UE may determine a pathloss for each RS transmitted from a base station and one or more RISs. It may be desirable to configure the UE to determine an effective pathloss as a function of the pathloss associated with each RS transmitted from the base station and one or more RISs. In some examples, the uplink transmission power may be based on the effective pathloss.

FIG. 4A is a block diagram illustrating a wireless network 400 including a base station 402 and multiple RISs 404 and 406, in accordance with aspects of the present disclosure. As shown in FIG. 4A, the wireless network 400 may include the base station 402, a first RIS 404, a second RIS 406, and a UE 408. The base station 402 may be an example of a base station 110 and 302 described with reference to FIGS. 1, 2, and 3, respectively. The RISs 404 and 406 may be an example of a RIS 310 described with reference to FIG. 3.

The UE 408 may be an example of a UE 120, 312, and 314 described with reference to FIGS. 1, 2, and 3, respectively.

In the example of FIG. 4A, the base station 402 may transmit multiple RSs (shown as RS1, RS2, and RS3 in FIG. 4A) to the UE 408. As shown in FIG. 4A, each of the RSs may be received directly from the base station 402 or based on a reflection from one RIS of a set of RISs 404 and 406. In some examples, the base station may configure each RIS of the set of RISs 404 and 406 as an operative RIS or an inoperative RIS. In such examples, a RIS configured as an operative RIS may reflect a signal received from the base station 402 or the UE 408 in a direction specified based on the configuration. In other such examples, a RIS configured as an inoperative RIS may scatter a signal received from the base station 402 or the UE 408. A scattered signal may fail to reach a wireless device, such as the base station 402 or the UE 408. Each RIS 404, 406 still acts as a passive device regardless of whether the RIS is configured as an operative RIS or an inoperative RIS.

As shown in FIG. 4A, based on a configuration by the base station 402, the first RIS 404 reflects a first RS RS1 from the base station 402 to the UE 408 and the second RIS 406 reflects a third RS RS3 from the base station 402 to the UE 408. In the current example, the base station 402 may also transmit a second RS RS2 directly to the UE 408. In some examples, the UE 408 may determine a pathloss based on each received RS, such as the first RS RS1, the second RS RS2, and the third RS RS3. Still, a number of operative RISs configured to reflect a signal from the UE to the base station may be different from a number of operative RISs configured to reflect a signal from the base station to the UE. For example, as shown in FIG. 4A, for a downlink transmission from the base station 402 to the UE 408, the first RIS 404 and the second RIS 406 may be configured as operative RISs. In such an example, for an uplink transmission from the UE 408 to the base station 402, only the first RIS 404 may be configured as an operative RIS and the second RIS 406 may be configured as an inoperative RIS. In this example, the second RIS 406 may scatter the uplink signal transmitted by the UE 408. Therefore, an effective pathloss for determining an uplink transmission power should only be based on a pathloss associated with the first RS RS1 reflected from the first RIS 404 and a pathloss associated with the second RS RS2 received directly from the base station 402. In some implementations, the base station 402 transmits a message indicating the operative RISs, such that the effective pathloss is based on each pathloss associated with an RS received from an operative RIS and a pathloss associated with an RS received from the base station 402.

Figure 4B:
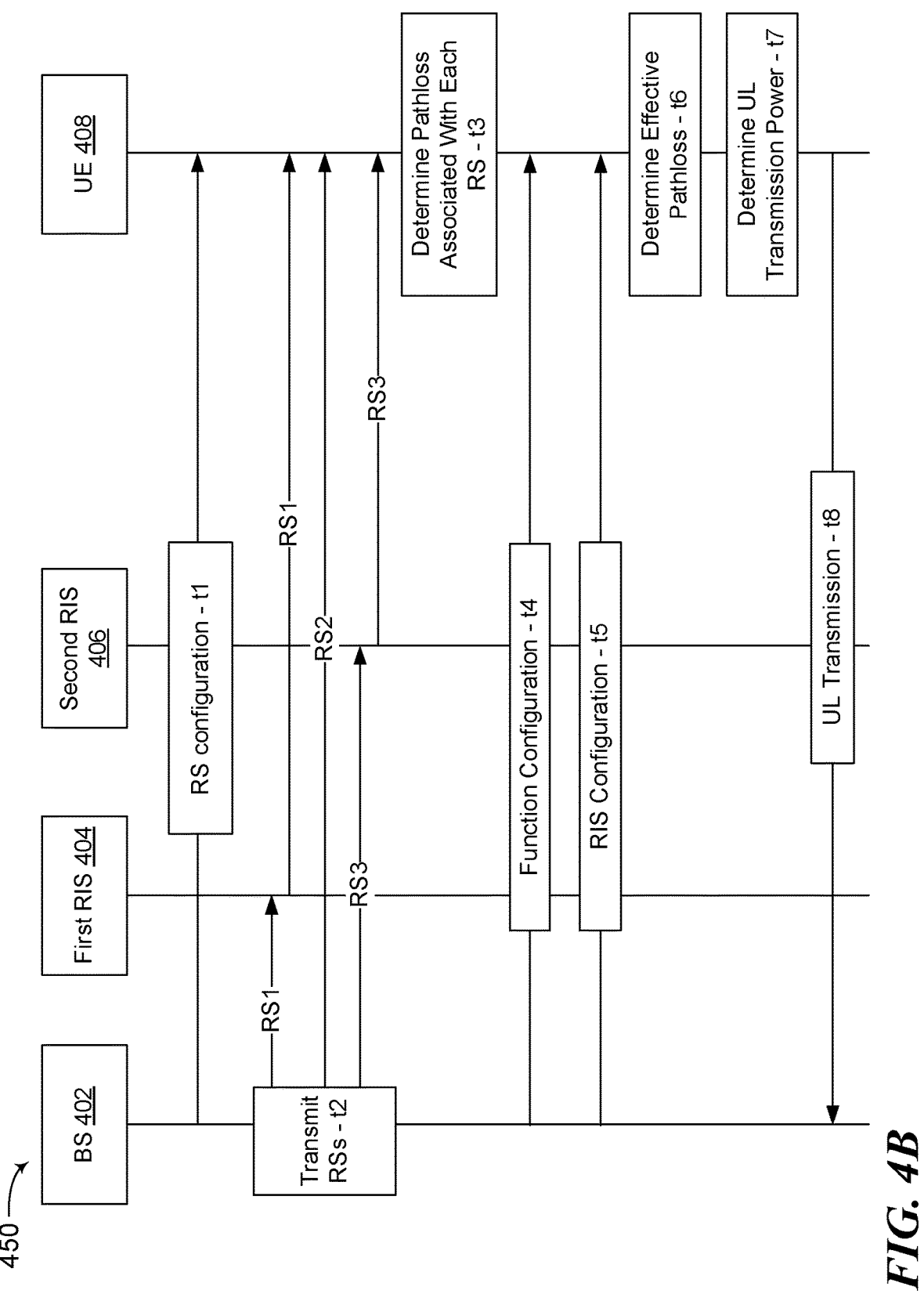
FIG. 4B is a timing diagram illustrating an example of determining an uplink transmission power at a UE, in accordance with aspects of the present disclosure

FIG. 4B is a timing diagram illustrating an example 450 of determining an uplink transmission power at a UE 408, in accordance with aspects of the present disclosure. In the example 450 of FIG. 4B, operations of the base station 402, the first RIS 404, the second RIS 406, and the UE 408 may be similar to the operations described with reference to FIG. 4A. As described above, the base station 402 may be an example of a base station 110 and 302 described with reference to FIGS. 1, 2, and 3, respectively. The RISs 404 and 406 may be an example of a RIS 310 described with reference to FIG. 3. The UE 408 may be an example of a UE 120, 312, and 314 described with reference to FIGS. 1, 2, and 3, respectively.

As shown in FIG. 4B, at time t1, the base station 402 transmits an RS configuration for configuring the UE 408 to receive multiple RSs RS1, RS2, and RS3 and to determine a pathloss for each RS of the multiple RSs RS1, RS2, and RS3. Each of the RSs RS1, RS2, and RS3 is transmitted by the base station 402. As discussed, one or more of the RSs RS1, RS2, and RS3 may be associated with a reflection from a RIS. Additionally, each of the RSs RS1, RS2, and RS3 may be associated with a spatial configuration. A transmission direction (for example, beamforming in a spatial direction) of an RS may be based on the spatial configuration. The spatial configuration may be based on a propagation channel between the base station and the RIS associated with the RS. In the current example, the first RS RS1 is associated with a reflection from the first RIS 404, and the third RS RS3 is associated with a reflection from the second RIS 406. Additionally, the second RS RS2 is associated with a direct transmission from the base station 402.

As shown in FIG. 4B, at time t2, the base station 402 transmits the RSs RS1, RS2, and RS3. As discussed, the UE 408 receives the first RS RS1 based on a reflection from the first RIS 404. The UE 408 also receives the third RS RS3 based on a reflection from the second RIS 406. Additionally, the UE 408 receives the second RS RS2 based on a direct transmission from the base station 402. At time t3, the UE 408 determines a pathloss for each received RS of the multiple RSs RS1, RS2, and RS3. At time t4, the base station 402 transmits a function configuration indicating a function for determining an effective pathloss based on one or more pathlosses determined at time t3. As an example, the function may be a linear average, geometric average, maximum, or minimum of the one or more pathlosses. Each of the one or more pathlosses may be associated with an RS that corresponds to an operative RIS.

As discussed, a number of operative RISs that may be configured to reflect a downlink transmission from the base station 402 to the UE 408 may be different from a number of operative RISs that may be configured to reflect an uplink transmission from the UE 408 to the base station 402. Therefore, to improve an accuracy of an uplink transmission power, at time t5, the base station 402 transmits an RIS configuration indicating a set of operative RISs. Each RIS in the set of operative RISs is one RIS of the multiple RISs 404 and 406. However, the number of RISs in the set of operative RISs may be less than the number of RISs that were operative for the downlink transmission from the base station 402.

In the example of FIG. 4B, at time t6, the UE 408 determines an effective pathloss as a function of each pathloss of a set of pathlosses. Each pathloss of the set of pathlosses may be associated with a respective RS of a set of RSs, and each RS of the set of RSs may be associated with a respective RIS of the set of operative RISs or the base station. In some examples, at time t7, the UE 408 may determine an uplink transmission power based on the effective pathloss. In some such examples, the uplink transmission power may be based on Equation 1, where the variable $PL_{b,f,c}(q_d)$ is equal to the effective pathloss. At time t8, the UE 408 performs an uplink transmission according to the uplink transmission power determined at time t7.

In some implementations, RISs may be group based on a geographic location. In some examples, a location of each RIS in a group of RISs may satisfy distance criteria. In some such examples, the distance criteria is satisfied based on a distance between locations of each pair of RISs in the group of RISs being less than a distance threshold. In some implementations, each RIS may be associated with a group ID. The group ID may be used for determining a pathloss.

Figure 5:
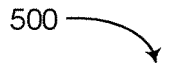
FIG. 5 is a block diagram of a wireless communication device that determines an effective pathloss based on a set of pathlosses, in accordance with aspects of the present disclosure.

FIG. 5 is a block diagram of a wireless communication device 500 that determines an effective pathloss based on a set of pathlosses, where each pathloss of the set of pathlosses is associated with an RS received based on a reflection from a RIS or a direct transmission from a base station, in accordance with aspects of the present disclosure. The wireless communication device 500 may be an example of aspects of a UE 120, described with reference to FIGS. 1 and 2. The wireless communication device 500 may include a receiver 510, a communication manager 515, and a transmitter 520, which may be in communication with one another (for example, via one or more buses). In some implementations, the receiver 510 and the transmitter 520 may operate in conjunction with an RS component 525 and a pathloss component 535. In some examples, the wireless communication device 500 is configured to perform operations, including operations of the process 600 described below with reference to FIG. 6.

In some examples, the wireless communication device 500 can include a chip, system on chip (SoC), chipset, package, or device that includes at least one processor and at least one modem (for example, a 5G modem or other cellular modem). In some examples, the communication manager 515, or its sub-components, may be separate and distinct components. In some examples, at least some components of the communication manager 515 are implemented at least in part as software stored in a memory. For example, portions of one or more of the components of the communication manager 515 can be implemented as non-transitory code executable by the processor to perform the functions or operations of the respective component.

The receiver 510 may receive one or more reference signals (for example, periodically configured CSI-RSs, aperiodically configured CSI-RSs, or multi-beam-specific reference signals), synchronization signals (for example, synchronization signal blocks (SSBs)), control information, and/or data information, such as in the form of packets, from one or more other wireless communication devices via various channels including control channels (for example, a physical downlink control channel (PDCCH) and data channels (for example, a physical downlink shared channel (PDSCH)). The other wireless communication devices may include, but are not limited to, another UE 120 or a base station 110, described with reference to FIGS. 1 and 2.

The received information may be passed on to other components of the wireless communication device 500. The receiver 510 may be an example of aspects of the receive processor 258 described with reference to FIG. 2. The receiver 510 may include a set of radio frequency (RF) chains that are coupled with or otherwise utilize a set of antennas (for example, the set of antennas may be an example of aspects of the antennas 252a through 252r described with reference to FIG. 2).

The transmitter 520 may transmit signals generated by the communication manager 515 or other components of the wireless communication device 500. In some examples, the transmitter 520 may be collocated with the receiver 510 in a transceiver. The transmitter 520 may be an example of aspects of the transmit processor 264 described with reference to FIG. 2. The transmitter 520 may be coupled with or otherwise utilize a set of antennas (for example, the set of antennas may be an example of aspects of the antennas 252a through 252r described with reference to FIG. 2), which may be antenna elements shared with the receiver 510. In some examples, the transmitter 520 is configured to transmit control information in a physical uplink control channel (PUCCH) and data in a physical uplink shared channel (PUSCH).

The communication manager 515 may be an example of aspects of the controller/processor 280 described with reference to FIG. 2. The communication manager 515 includes the RS component 525 and the pathloss component 535. In some examples, working in conjunction with the receiver 510, the RS component 525 receives multiple RSs, each RS of the multiple RSs may be associated with a reflection from a respective RIS, of multiple RISs, or with a direct trans- mission from a base station. Additionally, working in con- junction with the receiver 510 and the RS component 525, the pathloss component 535 receives a RIS configuration indicating a set of operative RISs, of the multiple RISs, that are configured to reflect an uplink transmission from the UE. Finally, working in conjunction with the pathloss component 535, the transmitter 520 transmits an uplink message accord- ing to an uplink transmission power. The uplink transmis- sion power may be based on an effective pathloss that is a function of each pathloss of a set of pathlosses respectively associated with a set of RSs, of the multiple RSs, that are respectively associated with the set of operative RISs or the base station.

FIG. 6 is a flow diagram illustrating an example process 600 performed, for example, by a user equipment (UE), in accordance with various aspects of the present disclosure. The example process 600 is an example of determining an effective pathloss based on a set of pathlosses, where each pathloss of the set of pathlosses is associated with an RS received based on a reflection from a RIS or a direct transmission from a base station, in accordance with aspects of the present disclosure.

As shown in FIG. 6, the process 600 begins at block 602 by receiving multiple RSs, each RS of the multiple RSs may be associated with a reflection from a respective RIS, of multiple RISs, or with a direct transmission from a base station. At block 604, the process 600 receives, from the base station, a RIS configuration indicating a set of operative RISs, of the multiple RISs, that reflect an uplink transmis- sion from the UE. In some examples, each operative RIS in the set of operative RISs is one RIS of the set of RISs. At block 606, the process 600 transmits, to the base station, an uplink message according to an uplink transmission power. The uplink transmission power may be based on an effective pathloss that is a function of each pathloss of a set of pathlosses respectively associated with a set of RSs, of the multiple RSs, that are respectively associated with the set of operative RISs or the base station.

Figure 7:
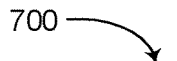
FIG. 7 is a block diagram of a wireless communication device that indicates one or more operative RISs to a UE for determining an effective pathloss based on a set of pathlosses, in accordance with aspects of the present disclosure.

FIG. 7 is a block diagram of a wireless communication device 700 that indicates one or more operative RISs to a UE for determining an effective pathloss based on a set of pathlosses, in accordance with aspects of the present dis- closure. In some examples, each pathloss of the set of pathlosses is associated with an RS received based on a reflection from an operative RIS or a direct transmission from a base station. The wireless communication device 700 may be an example of aspects of a base station 110, described with reference to FIGS. 1 and 2. The wireless communication device 700 may include a receiver 710, a communications manager 715, and a transmitter 720, which may be in communication with one another (for example, via one or more buses). In some examples, the wireless communication device 700 is configured to perform opera- tions, including operations of the process 800 described below with reference to FIG. 8.

In some examples, the wireless communication device 700 can include a chip, system on chip (SoC), chipset, package, or device that includes at least one processor and at least one modem (for example, a 5G modem or other cellular modem). In some examples, the communications manager 715, or its sub-components, may be separate and distinct components. In some examples, at least some components of the communications manager 715 are imple- mented at least in part as software stored in a memory. For example, portions of one or more of the components of the communications manager 715 can be implemented as non- transitory code executable by the processor to perform the functions or operations of the respective component.

The receiver 710 may receive one or more reference signals (for example, periodically configured CSI-RSs, ape- riodically configured CSI-RSs, or multi-beam-specific ref- erence signals), synchronization signals (for example, syn- chronization signal blocks (SSBs)), control information, and/or data information, such as in the form of packets, from one or more other wireless communication devices via various channels including control channels (for example, a PDCCH) and data channels (for example, a PDSCH). The other wireless communication devices may include, but are not limited to, another base station 110 or a UE 120, described with reference to FIGS. 1 and 2.

The received information may be passed on to other components of the wireless communication device 700. The receiver 710 may be an example of aspects of the receive processor 238 described with reference to FIG. 2. The receiver 710 may include a set of radio frequency (RF) chains that are coupled with or otherwise utilize a set of antennas (for example, the set of antennas may be an example of aspects of the antennas 234a through 234t described with reference to FIG. 2).

The transmitter 720 may transmit signals generated by the communications manager 715 or other components of the wireless communication device 700. In some examples, the transmitter 720 may be collocated with the receiver 710 in a transceiver. The transmitter 1120 may be an example of aspects of the transmit processor 220 described with refer- ence to FIG. 2. The transmitter 720 may be coupled with or otherwise utilize a set of antennas (for example, the set of antennas may be an example of aspects of the antennas 234a through 234t), which may be antenna elements shared with the receiver 710. In some examples, the transmitter 720 is configured to transmit control information in a physical uplink control channel (PUCCH) and data in a physical uplink shared channel (PUSCH).

The communications manager 715 may be an example of aspects of the controller/processor 240 described with ref- erence to FIG. 2. The communications manager 715 includes an RS component 725 and an operative RIS com- ponent 735. In some examples, working in conjunction with the transmitter 720, the RS component 725 transmits, to a UE, an RS configuration for configuring the UE to receive multiple RSs, each RS of the multiple RSs may be associ- ated with a reflection from a respective RIS, of multiple RISs, or with a direct transmission from a base station. Additionally, working in conjunction with the transmitter 720, the operative RIS component 735 transmits, to the UE, a RIS configuration indicating a set of operative RISs, of the multiple RISs, that reflect an uplink transmission from the UE. Finally, working in conjunction with the RS component 725 and the operative RIS component 735, the receiver 710 receives, from the UE, an uplink message according to an uplink transmission power. The uplink transmission power may be based on an effective pathloss that is a function of each pathloss of a set of pathlosses respectively associated with a set of RSs, of the multiple RSs, that are respectively associated with the set of operative RISs or the base station.

FIG. 8 is a flow diagram illustrating an example process 800 performed, for example, by a base station, in accordance with various aspects of the present disclosure. The example process 800 is an example of indicating one or more operative RISs to a UE for determining an effective pathloss based on a set of pathlosses, where each pathloss of the set of pathlosses is associated with an RS received based on a reflection from an operative RIS or a direct transmission from a base station, in accordance with aspects of the present disclosure.

As shown in FIG. 8, the process 800 begins at block 802 by transmitting, to a UE, an RS configuration for configuring the UE to receive multiple RSs, each RS of the multiple RSs may be associated with a reflection from a respective RIS, of multiple RISs, or with a direct transmission from a base station. At block 804, the process 800 transmits, to the UE, a RIS configuration indicating a set of operative RISs, of the multiple RISs, that reflect an uplink transmission from the UE. At block 806, the process 800 receives, from the UE, an uplink message according to an uplink transmission power. The uplink transmission power may be based on an effective pathloss that is a function of each pathloss of a set of pathlosses respectively associated with a set of RSs, of the multiple RSs, that are respectively associated with the set of operative RISs or the base station.

The following provides an overview of some Aspects of the present disclosure:

Aspect 1. A method for wireless communication performed by a UE, comprising: receiving a plurality of RSs, each RS of the multiple RSs may be associated with a reflection from a respective RIS, of multiple RISs, or with a direct transmission from a base station; receiving, from the base station, a RIS configuration indicating a set of operative RISs, of the multiple RISs, that reflect an uplink transmission from the UE; and transmitting, to the base station, an uplink message according to an uplink transmission power, the uplink transmission power being based on an effective pathloss, the effective pathloss being a function of each pathloss of a set of pathlosses, each pathloss of the set of pathlosses associated with a respective RS of a set of RSs, each RS of the set of RSs associated with a respective operative RIS of the set of operative RISs or the base station.

Aspect 2. The method of Aspect 1, further comprising receiving, from the base station, a function configuration indicating the function for determining the effective pathloss.

Aspect 3. The method of Aspect 2, wherein the function is a linear average, a geometric average, a maximum, or a minimum.

Aspect 4. The method of any one of Aspects 1-3, further comprising receiving, from the base station, an RS configuration for configuring the UE to receive each RS of the plurality of RSs.

Aspect 5. The method of any one of Aspects 1-4, wherein the RIS configuration is received in an RRC message, a MAC-CE message, or DCI.

Aspect 6. The method of any one of Aspects 1-5, wherein two or more operative RISs of the set of operative RISs are associated with a group of operative RISs based on a distance between each pair of operative RISs of the two or more operative RISs satisfying a distance criteria.

Aspect 7. The method of any one of Aspects 1-6, wherein each operative RIS of the set of operative RISs is associated with a corresponding group identifier.

Aspect 8. The method of any one of Aspects 1-7, further comprising receiving, from the base station, a TPC command field value associated with a TPC command value in a TPC table, wherein the uplink transmission power is further based on the TPC command value.

Aspect 9. The method of Aspect 8, further comprising receiving TPC values associated with the TPC table via an RRC message.

Aspect 10. The method of Aspect 8, further comprising receiving, from the base station, a message indicating the TPC table from a plurality of TPC tables based on a presence of the set of RIS in a network associated with the base station.

Aspect 11. The method of any one of Aspects 1-10, wherein each RS of the plurality of RSs is associated with a spatial configuration, the spatial configuration based on a propagation channel between the base station and the RIS associated with the respective RS of the plurality of RSs.

Aspect 12. A method for wireless communication performed by a base station, comprising: transmitting, to a UE, an RS configuration for configuring the UE to receive a plurality of RSs, each RS of the multiple RSs may be associated with a reflection from a respective RIS, of multiple RISs, or with a direct transmission from a base station; transmitting, to the UE, a RIS configuration indicating a set of operative RISs, of the multiple RISs, that reflect an uplink transmission from the UE; and receiving, from the UE, an uplink message according to an uplink transmission power, the uplink transmission power being based on an effective pathloss that is a function of each pathloss of a set of pathlosses respectively associated with a set of RSs, of the plurality of RSs, that are respectively associated with the set of operative RISs or the base station.

Aspect 13. The method of Aspect 12, further comprising transmitting, to the UE, a function configuration indicating the function for determining the effective pathloss.

Aspect 14. The method of any one of Aspects 12-13, wherein the function is a linear average, a geometric average, a maximum, or a minimum.

Aspect 15. The method of any one of Aspects 12-14, wherein the RIS configuration is transmitted in an RRC message, a MAC-CE message, or DCI.

Aspect 16. The method of any one of Aspects 12-15, wherein two or more operative RISs of the set of operative RISs are associated with a group of operative RISs based on a distance between each pair of operative RISs of the two or more operative RISs satisfying a distance criteria.

Aspect 17. The method of any one of Aspects 12-16, wherein each operative RIS of the set of operative RISs is associated with a corresponding group identifier.

Aspect 18. The method of any one of Aspects 12-17, further comprising transmitting, to the UE, a TPC command field value associated with a TPC command value in a TPC table, wherein the uplink transmission power is further based on the TPC command value.

Aspect 19. The method of Aspect 18, further comprising transmitting TPC values associated with the TPC table via an RRC message.

Aspect 20. The method of Aspect 18, further comprising transmitting, to the UE, a message indicating the TPC table from a plurality of TPC tables based on a presence of the set of RIS in a network associated with the base station.

Aspect 21. The method of any one of Aspects 12-20, wherein each RS of the plurality of RSs is associated with a spatial configuration, the spatial configuration based on a propagation channel between the base station and the RIS associated with the respective RS of the plurality of RSs.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication performed by a user equipment (UE), comprising:
   receiving a plurality of reference signals (RSs), each RS of the plurality of RSs being associated with a reflection from a respective reconfigurable intelligent surface (RIS), of a plurality of RISs, or with a direct transmission from a base station;
   receiving, from the base station, a RIS configuration indicating a set of operative RISs, of the plurality of RISs, that reflect an uplink transmission from the UE; and
   transmitting, to the base station, an uplink message according to an uplink transmission power, the uplink transmission power being based on an effective pathloss that is a function of each pathloss of a set of pathlosses respectively associated with a set of RSs, of the plurality of RSs, that are respectively associated with the set of operative RISs or the base station.

2. The method of claim 1, further comprising receiving, from the base station, a function configuration indicating the function for determining the effective pathloss.

3. The method of claim 2, wherein the function is a linear average, a geometric average, a maximum, or a minimum.

4. The method of claim 1, further comprising receiving, from the base station, an RS configuration for configuring the UE to receive each RS of the plurality of RSs.

5. The method of claim 1, wherein the RIS configuration is received in a radio resource control (RRC) message, a medium access control-control element (MAC-CE) message, or downlink control information (DCI).

6. The method of claim 1, wherein two or more operative RISs of the set of operative RISs are associated with a group of operative RISs based on a distance between each pair of operative RISs of the two or more operative RISs satisfying a distance criteria.

7. The method of claim 1, wherein each operative RIS of the set of operative RISs is associated with a corresponding group identifier.

8. The method of claim 1, further comprising receiving, from the base station, a transmit power control (TPC) command field value associated with a TPC command value in a TPC table, wherein the uplink transmission power is further based on the TPC command value.

9. The method of claim 8, further comprising receiving TPC values associated with the TPC table via a radio resource control (RRC) message.

10. The method of claim 8, further comprising receiving a message indicating the TPC table from a plurality of TPC tables based on a presence of the set of RISs in a network associated with the base station.

11. The method of claim 1, wherein each RS of the plurality of RSs is associated with a spatial configuration, the spatial configuration based on a propagation channel between the base station and the RIS associated with the respective RS of the plurality of RSs.

12. An apparatus for wireless communications at a user equipment (UE), comprising:
   a processor;
   a memory coupled with the processor; and
   instructions stored in the memory and operable, when executed by the processor, to cause the apparatus to:
      receive a plurality of reference signals (RSs), each RS of the plurality of RSs being associated with a reflection from a respective reconfigurable intelligent surface (RIS), of a plurality of RISs, or with a direct transmission from a base station;
      receive, from the base station, a RIS configuration indicating a set of operative RISs, of the plurality of RISs, that reflect an uplink transmission from the UE; and transmit, to the base station, an uplink message according to an uplink transmission power, the uplink transmission power being based on an effective pathloss that is a function of each pathloss of a set of pathlosses respectively associated with a set of RSs, of the plurality of RSs, that are respectively associated with the set of operative RISs or the base station.

13. The apparatus of claim 12, wherein:

execution of the instructions further cause the apparatus to receive, from the base station, a function configuration indicating the function for determining the effective pathloss; and the function is a linear average, a geometric average, a maximum, or a minimum.

14. The apparatus of claim 12, wherein execution of the instructions further cause the apparatus to receive, from the base station, a transmit power control (TPC) command field value associated with a TPC command value in a TPC table, wherein the uplink transmission power is further based on the TPC command value.

15. The apparatus of claim 14, wherein execution of the instructions further cause the apparatus to:

receive TPC values associated with the TPC table via a radio resource control (RRC) message; or receive a message indicating the TPC table from a plurality of TPC tables based on a presence of the set of RISs in a network associated with the base station.

16. A method for wireless communication performed by a base station, comprising:

transmitting, to a user equipment (UE), a reference signal (RS) configuration for configuring the UE to receive a plurality of RSs, each RS of the plurality of RSs being associated with a reflection from a respective reconfigurable intelligent surface (RIS), of a plurality of RISs, or with a direct transmission from a base station;

transmitting, to the UE, a RIS configuration indicating a set of operative RISs, of the plurality of RISs, that reflect an uplink transmission from the UE; and receiving, from the UE, an uplink message according to an uplink transmission power, the uplink transmission power being based on an effective pathloss that is a function of each pathloss of a set of pathlosses respectively associated with a set of RSs, of the plurality of RSs, that are respectively associated with the set of operative RISs or the base station.

17. The method of claim 16, further comprising transmitting, to the UE, a function configuration indicating the function for determining the effective pathloss.

18. The method of claim 17, wherein the function is a linear average, a geometric average, a maximum, or a minimum.

19. The method of claim 16, wherein the RIS configuration is transmitted in a radio resource control (RRC) message, a medium access control-control element (MAC-CE) message, or downlink control information (DCI).

20. The method of claim 16, wherein two or more operative RISs of the set of operative RISs are associated with a group of operative RISs based on a distance between each pair of operative RISs of the two or more operative RISs satisfying a distance criteria.

21. The method of claim 16, wherein each operative RIS of the set of operative RISs is associated with a corresponding group identifier.

22. The method of claim 16, further comprising transmitting, to the UE, a transmit power control (TPC) command field value associated with a TPC command value in a TPC table, wherein the uplink transmission power is further based on the TPC command value.

23. The method of claim 22, further comprising transmitting TPC values associated with the TPC table via a radio resource control (RRC) message.

24. The method of claim 22, further comprising transmitting, to the UE, a message indicating the TPC table from a plurality of TPC tables based on a presence of the set of RISs in a network associated with the base station.

25. The method of claim 16, wherein each RS of the plurality of RSs is associated with a spatial configuration, the spatial configuration based on a propagation channel between the base station and the RIS associated with the respective RS of the plurality of RSs.

26. An apparatus for wireless communications at a base station, comprising:

a processor;

a memory coupled with the processor; and instructions stored in the memory and operable, when executed by the processor, to cause the apparatus to:

transmit, to a user equipment (UE), a reference signal (RS) configuration for configuring the UE to receive a plurality of RSs, each RS of the plurality of RSs being associated with a reflection from a respective reconfigurable intelligent surface (RIS), of a plurality of RISs, or with a direct transmission from a base station;

transmit, to the UE, a RIS configuration indicating a set of operative RISs, of the plurality of RISs, that reflect an uplink transmission from the UE; and receive, from the UE, an uplink message according to an uplink transmission power, the uplink transmission power being based on an effective pathloss that is a function of each pathloss of a set of pathlosses respectively associated with a set of RSs, of the plurality of RSs, that are respectively associated with the set of operative RISs or the base station.

27. The apparatus of claim 26, wherein:

execution of the instructions further cause the apparatus to transmit, to the UE, a function configuration indicating the function for determining the effective pathloss; and the function is a linear average, a geometric average, a maximum, or a minimum.

28. The apparatus of claim 26, wherein execution of the instructions further cause the apparatus to transmit, to the UE, a transmit power control (TPC) command field value associated with a TPC command value in a TPC table, wherein the uplink transmission power is further based on the TPC command value.

29. The apparatus of claim 28, wherein execution of the instructions further cause the apparatus to:

transmit TPC values associated with the TPC table via a radio resource control (RRC) message; or transmit a message indicating the TPC table from a plurality of TPC tables based on a presence of the set of RISs in a network associated with the base station.

30. The apparatus of claim 26, wherein two or more operative RISs of the set of operative RISs are associated with a group of operative RISs based on a distance between each pair of operative RISs of the two or more operative RISs satisfying a distance criteria.

*     *     *     *     *